United States Patent
Gao

(10) Patent No.: US 7,392,662 B2
(45) Date of Patent: Jul. 1, 2008

(54) METHOD AND SYSTEM FOR CONTROLLING A CLIMATE CONTROL SYSTEM

(75) Inventor: Shixiang Gao, Lake Orion, MI (US)

(73) Assignee: Chrysler LLC, Auburn Hills, MI (US)

( * ) Notice: Subject to any disclaimer, the term of this patent is extended or adjusted under 35 U.S.C. 154(b) by 523 days.

(21) Appl. No.: 11/201,547

(22) Filed: Aug. 11, 2005

(65) Prior Publication Data

US 2007/0033953 A1 Feb. 15, 2007

(51) Int. Cl.
- *B60H 1/32* (2006.01)
- *G01K 1/00* (2006.01)
- *G06F 7/00* (2006.01)

(52) U.S. Cl. .................. 62/133; 62/244; 702/130; 701/36; 165/42

(58) Field of Classification Search .......... 62/133, 62/228.1, 131, 244; 701/36; 702/130, 99; 237/2 A; 165/42, 43, 202; 374/141

See application file for complete search history.

(56) References Cited

U.S. PATENT DOCUMENTS

| 5,001,656 A | * | 3/1991 | Zimmerman et al. ........ 700/299 |
| 5,416,728 A | | 5/1995 | Rudzewicz et al. |
| 5,579,994 A | | 12/1996 | Davis et al. |
| 5,995,889 A | | 11/1999 | Eisenhour |
| 6,088,661 A | * | 7/2000 | Poublon ..................... 702/130 |
| 6,974,251 B2 | * | 12/2005 | DeRonne et al. ............ 374/144 |

* cited by examiner

*Primary Examiner*—Chen-Wen Jiang
(74) *Attorney, Agent, or Firm*—Ralph E. Smith

(57) ABSTRACT

A method and system for controlling a climate control system on a vehicle after entering a heat soak mode in which the outside air temperature associated with the vehicle is affected by absorption of non-ambient heat includes an ambient temperature sensor for sensing a current ambient temperature outside the vehicle. A controller coupled to the ambient temperature sensor compares the current ambient temperature to a stored ambient temperature representative of the outside air temperature prior to entering the heat soak mode. The controller controls the climate control system using the current ambient temperature if the current ambient temperature is less than the stored ambient temperature. If the current ambient temperature is greater than the stored ambient temperature, the controller determines a heat build up affecting the current ambient temperature and controls the climate control system using the current ambient temperature only upon elimination of the heat build up.

10 Claims, 2 Drawing Sheets

METHOD AND SYSTEM FOR CONTROLLING A CLIMATE CONTROL SYSTEM

FIELD OF THE INVENTION

The present invention relates to a climate control system on a vehicle and, in particular, to a method and system for controlling a climate control system on a vehicle after entering a heat soak mode.

BACKGROUND OF THE INVENTION

A climate control system on a vehicle, such as a motor vehicle, maintains a condition within an occupant compartment of the vehicle at a comfortable level by providing heating, cooling and ventilation. One example of a condition is air temperature, another is air distribution, while still another is air flow rate. Typically, the comfort level is subjectively determined by an occupant of the vehicle and communicated to the climate control system via a set point or other temperature control actuator, as is known in the art.

Climate control within the occupant is maintained by an integrated mechanism referred to in the art as a heating, ventilation and air conditioning (HVAC) system. In an automatic HVAC system, the comfort level within the occupant compartment of the vehicle is dependent on many objective and subjective factors, such as occupant preference, vehicle operating conditions, ambient temperature, humidity level, and sun heating load. The HVAC control system typically includes sensing mechanisms either within or outside the occupant compartment to maintain the desired comfort level. One example of a sensing mechanism is an ambient temperature sensor that measures the outside air temperature. The outside air temperature sensed by the ambient temperature sensor is one of several factors used by the HVAC system in maintaining the comfort level within the occupant compartment.

An ambient temperature sensor is typically located behind the vehicle front bumper. The sensor reading sometimes is increased by the engine heat, or the ground heat while the vehicle is idling, short time parking or moving at a very low vehicle speed. This causes an error in ambient temperature measurement. Typically a software routine is designed to filter out the errors in ambient temperature measurement by determining when to use the sensor reading as the control input and when to replace the sensor reading by using a previous sensor reading. The integrity of the ambient temperature sensor reading filter routine will affect the HVAC comfort level.

The key for a good ambient temperature reading is timing. The first decision needed is to determine when to stop using the sensor reading; this state is called the Heat Soak Mode. The Heat Soak Mode is typically entered when the vehicle speed is under a predetermined speed limit for a predetermined amount of time. While the system is in the Heat Soak Mode, the sensor reading is at error and will not be used. Instead the last ambient temperature sensor reading before entering the Heat Soak Mode will be used as the ambient temperature input until the system exits the Heat Soak Mode. Thus, the second decision needed is to determine when the ambient temperature sensor reading can be used again. The known prior art exits the Heat Soak Mode and uses the actual ambient temperature sensor reading when the vehicle speed is above a fixed limit for a predetermined amount of time, as disclosed in U.S. Pat. No. 5,416,728. However, the actual time period for when the ambient temperature sensor readings should be used is not fixed, but rather variable. Thus, using a variable timer will improve the accuracy of the measurement.

It is, therefore, an object of the present invention to provide, in a vehicle, a method and system for determining when to use a current ambient temperature with a climate control system after entering a heat soak mode.

SUMMARY OF THE INVENTION

The present invention is a method and system for determining when to use a current ambient temperature with a HVAC climate control system on a vehicle after entering a heat soak mode in which the outside air temperature associated with the vehicle is affected by absorption of non-ambient heat. The method includes obtaining a current ambient temperature reading outside the vehicle and comparing the current ambient temperature reading to a stored ambient temperature wherein the stored ambient temperature is representative of the outside air temperature prior to entering the heat soak mode. The method also includes the step of controlling the HVAC system using the current ambient temperature if the current ambient temperature is less than the stored ambient temperature. If the current ambient temperature is greater than the stored ambient temperature, the method proceeds to determine a heat build up and control the HVAC system using the current ambient temperature upon elimination of the heat build up.

The system includes an ambient temperature sensor for sensing a current ambient temperature outside the vehicle. A controller coupled to the ambient temperature sensor compares the current ambient temperature to a stored ambient temperature. The stored ambient temperature is representative of the outside air temperature prior to entering the heat soak mode. The controller then controls the HVAC system using the current ambient temperature if the current ambient temperature is less than the stored ambient temperature. If the current ambient temperature is greater than the stored ambient temperature, the controller determines a heat build up associated with the current ambient temperature and controls the HVAC system using the current ambient temperature upon elimination of the heat build up.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
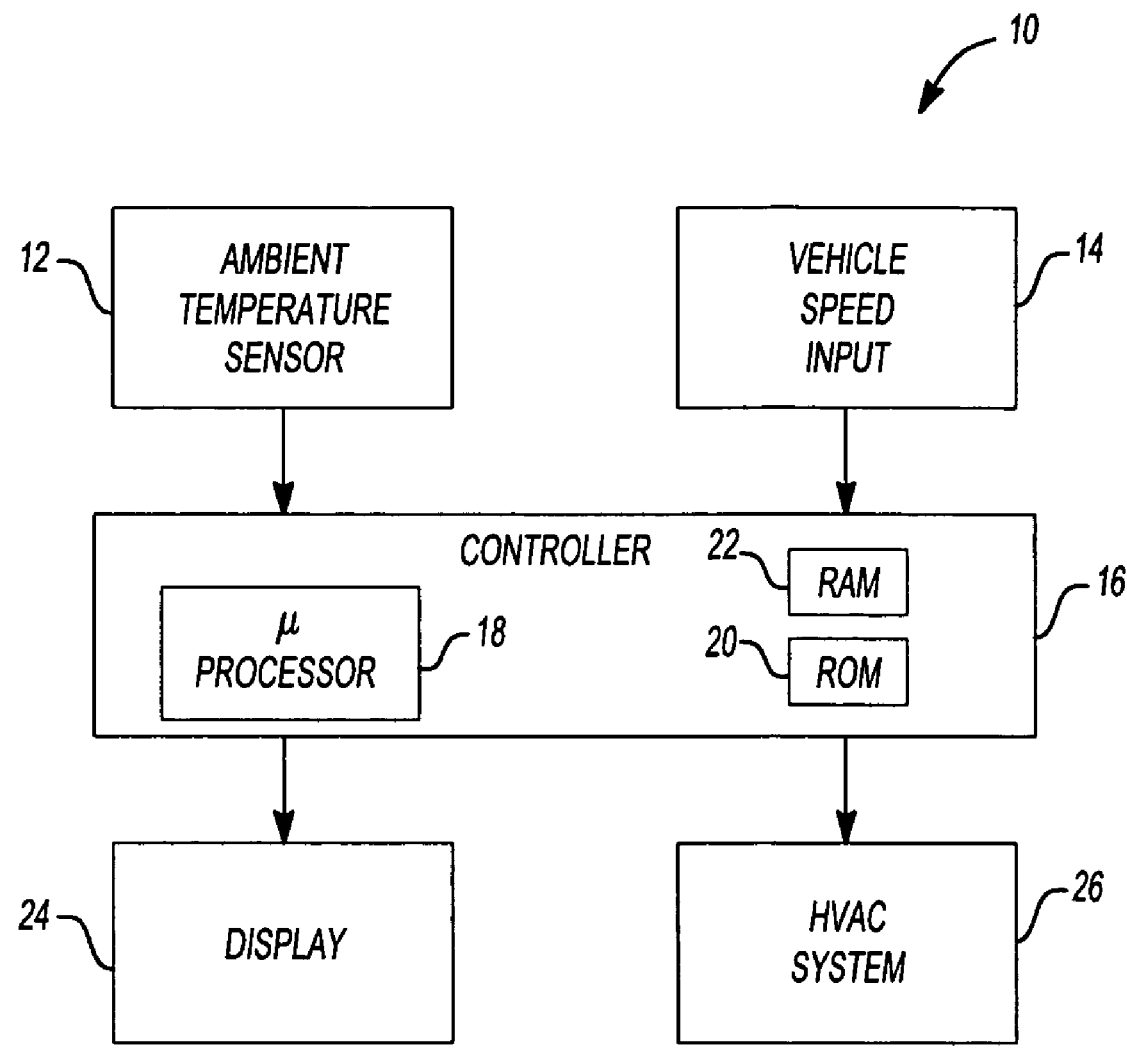
FIG. 1 is a functional block drawing of the preferred embodiment of the ambient temperature determination system of the present invention.

FIG. 1 depicts, in functional block diagram form, the preferred embodiment of the present invention. The system 10 for controlling a HVAC system to use current ambient temperature after entering a heat soak mode includes an external ambient temperature sensor 12 for sensing the ambient temperature outside the vehicle (not shown). The ambient temperature sensor 12 is typically mounted on the exterior of the vehicle.

A vehicle speed is an input to the software routine through the vehicle communication BUS, which may be obtained via wheel speed sensors (not shown) or some other sensors capable of sensing vehicle speed. The ambient temperature sensor 12 and the vehicle speed input 14 are in electrical communication with a controller 16 that includes a microprocessor 18, a Read Only Memory (ROM) 20, and a Random Access Memory (RAM) 22.

The system 10 also includes a display 24 coupled to the controller 16 for displaying the ambient temperature inside the vehicle, if desired. The controller 16 is also coupled to a HVAC system 26 for controlling the HVAC system using the ambient temperature.

The temperature reading from the ambient temperature sensor 12 is least reliable when the vehicle has been idling, i.e., engine is running and vehicle is not moving, for any prolonged length of time. If the vehicle is stationary while engine is running, the ambient temperature sensor 12 reading is most likely to be corrupted from heat sources other than the ambient air temperature, such as radiated ground heat or radiated or convection heat from the vehicle's engine heat. Under these conditions, the vehicle is in a heat soak mode and use of the ambient temperature sensor 12 reading in controlling the HVAC system 26 may be inaccurate. Thus, a stored ambient temperature will be used in controlling the HVAC system 26 until the heat soak condition ceases, at which time the ambient temperature sensor 12 reading may be used.

Figure 2:
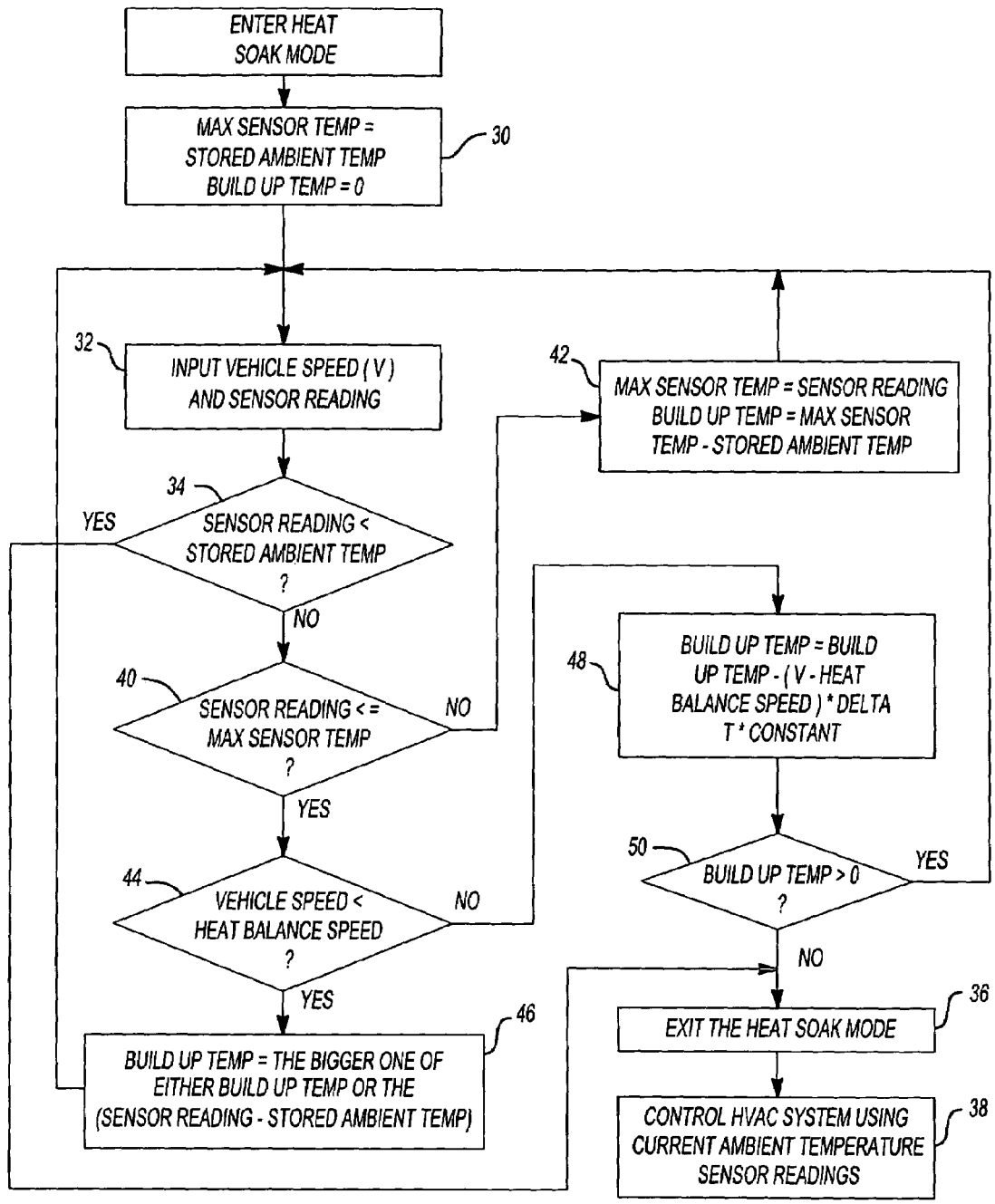
FIG. 2 is a flowchart illustrating the steps performed by the system of the present invention.

Turning now to the flowchart of FIG. 2, the steps performed by the system 10 of the present invention are shown. Upon entering the heat soak mode, the stored ambient temperature, which is representative of the last outside air temperature reading prior to entering the heat soak mode, is used as the HVAC ambient temperature. The first action to be performed in determining when to use the current ambient temperature reading, 30, is to set a maximum sensor temperature as the stored ambient temperature and store this value in RAM 22. The method continues, at step 32, by inputting the vehicle speed and by reading the current ambient temperature outside the vehicle via the ambient temperature sensor 12.

A first comparison is made by comparing the current ambient temperature reading to the stored ambient temperature value, as shown at step 34. If the current ambient temperature reading is less than the stored ambient temperature reading, there is no heat build up affecting the ambient temperature sensor 12 and the method exits the heat soak mode, 36. Thus, the HVAC system 26 is controlled based on the current ambient temperature, as shown at step 38.

If, however, the current ambient temperature is greater than the stored ambient temperature, the method proceeds to determine the heat build up that is affecting the current ambient temperature reading and determine when the heat build up is eliminated.

The determination of the heat build up varies depending upon several conditions. One condition involves comparing the current ambient temperature reading to the maximum sensor temperature, step 40. Since this is the first run through the method, maximum sensor temperature equals the stored ambient temperature, so the current ambient temperature reading will be either equal to or greater than the maximum sensor temperature, and the method proceeds to step 42 if the current ambient temperature reading is greater than the maximum sensor temperature.

At 42, the maximum sensor temperature is reset to the current ambient temperature sensor and stored in RAM 22. The heat build up is determined as the difference between the new maximum sensor temperature and the stored ambient temperature. This heat build up value, or build up temperature, is also stored in RAM 22.

Returning to step 40, if the current ambient temperature reading is less than or equal to the maximum sensor temperature, the method proceeds to examine the next condition at step 44. Here, the vehicle speed is compared to a heat balance speed. The heat balance speed is a configurable vehicle speed representative of the vehicle speed at which heat transfer into the ambient temperature sensor 12 due to surrounding heat equals heat loss due to the vehicle moving. In a preferred embodiment, the heat balance speed is about 10 to 20 mile/hour. In a normal condition, if the vehicle speed is slower than the heat balance speed, the ambient temperature sensor 12 reading will start to be affected by the engine heat. And if the vehicle speed is greater than the heat balance speed, the ambient temperature sensor 12 reading is approaching the right direction. The heat balance speed is determined by vehicle testing and related to the configuration and location of the ambient temperature sensor 12. The heat balance speed is stored in ROM 20 of the controller 16.

If the vehicle speed is less than the heat balance speed, the method proceeds to step 46 where the heat build up temperature is determined as the greater of the previously stored heat build up temperature or the difference between the current ambient temperature and the stored ambient temperature. The heat build up temperature is then stored in RAM 22 and the method returns to the beginning.

Returning to step 44, if the vehicle speed is greater than the heat balance speed, the method proceeds to step 48 where the heat build up temperature is determined according to:

Heat Build Up temperature=previous Heat Build Up temperature−(vehicle speed−heat balance speed)*Delta T*Constant, where Delta T is the elapsed time of the calculation cycle, preferably 1 second. The Constant is a configurable number, determined by vehicle testing, that relates to the ambient temperature sensor 12 configuration, location and heat transfer parameters.

After determining the heat build up temperature at step 48, the method proceeds to determine if the heat build up has been eliminated by determining if the heat build up exceeds 0, as shown at step 50. If so, the method returns to the beginning. If not, the heat build up is eliminated and the method exits the heat soak mode at step 36. Upon exiting the heat soak mode, the current ambient sensor temperature reading can now be used as true ambient temperature to replace the stored ambient.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for controlling a climate control system on a vehicle after entering a heat soak mode, the heat soak mode being a mode in which the outside air temperature associated with the vehicle is affected by absorption of non-ambient heat, the method comprising:

sensing a current ambient temperature outside the vehicle;

comparing the current ambient temperature to a stored ambient temperature, the stored ambient temperature representative of the outside air temperature prior to entering the heat soak mode;

controlling the climate control system using the current ambient temperature if the current ambient temperature is less than the stored ambient temperature;

determining a heat build up if the current ambient temperature is greater than the stored ambient temperature; and controlling the climate control system using the current ambient temperature upon elimination of the heat build up.

2. The method as recited in claim 1 further comprising:
displaying the HVAC ambient temperature in the vehicle.

3. The method as recited in claim 1 wherein determining the heat build up comprises:
determining a maximum temperature;
comparing the current ambient temperature to the maximum temperature; and
determining the heat build up based on a difference between the maximum temperature and the stored ambient temperature if the current ambient temperature is greater than the maximum temperature.

4. The method as recited in claim 3 wherein determining the heat build up further comprising:
determining a vehicle speed if the current ambient temperature is less than the maximum temperature;
comparing the vehicle speed to a predetermined heat balance speed, the heat balance speed representative of a vehicle speed at which heat transfer into the current ambient temperature due to surrounding heat equals heat loss due to the vehicle moving; and
determining the heat build up based on a difference between the current ambient temperature and the stored ambient temperature if the vehicle speed is less than the heat balance speed.

5. The method as recited in claim 4 wherein determining the heat build up further comprises:
determining the heat build up based on a difference between the vehicle speed and the heat balance speed if the vehicle speed is greater than the heat balance speed.

6. A system for controlling a climate control system on a vehicle after entering a heat soak mode, the heat soak mode being a mode in which the outside air temperature associated with the vehicle is affected by absorption of non-ambient heat, the system comprising:
an ambient temperature sensor for sensing a current ambient temperature outside the vehicle; and
a controller coupled to the ambient temperature sensor for:
comparing the current ambient temperature to a stored ambient temperature, the stored ambient temperature representative of the outside air temperature prior to entering the heat soak mode;
controlling the climate control system using the current ambient temperature if the current ambient temperature is less than the stored ambient temperature;
determining a heat build up associated with the current ambient temperature if the current ambient temperature is greater than the stored ambient temperature; and
controlling the climate control system using the current ambient temperature upon elimination of the heat build up.

7. The system as recited in claim 6 further comprising:
a display coupled to the controller for displaying the HVAC ambient temperature in the vehicle.

8. The system as recited in claim 6 wherein the controller, in determining the heat build up, is further provided for:
determining a maximum temperature;
comparing the current ambient temperature to the maximum temperature; and
determining the heat build up based on a difference between the maximum temperature and the stored ambient temperature if the current ambient temperature is greater than the maximum temperature.

9. The system as recited in claim 8 further comprising:
a speed sensor for sensing a vehicle speed; and
the controller, in determining the heat build up, is further provided for:
comparing the vehicle speed to a predetermined heat balance speed, the heat balance speed representative of a vehicle speed at which heat transfer into the current ambient temperature due to surrounding heat equals heat loss due to the vehicle moving if the current ambient temperature is less than the maximum temperature; and
determining the heat build up based on a difference between the current ambient temperature and the stored ambient temperature if the vehicle speed is less than the heat balance speed.

10. The system as recited in claim 9 wherein the controller, in determining the heat build up, is further provided for:
determining the heat build up based on a difference between the vehicle speed and the heat balance speed if the vehicle speed is greater than the heat balance speed.

* * * * *